MAGNETIC CORE COMPENSATING SYSTEMS

Filed May 31, 1955

2 Sheets-Sheet 1

INVENTORS
Jan A. Rajchman,
Arthur W. Lo &
George R. Briggs
BY Morris ... [signature]
ATTORNEY.

INVENTORS.
Jan A. Rajchman,
Arthur W. Lo &
George R. Briggs
BY Morris A. Rabkin
ATTORNEY.

2,887,675

MAGNETIC CORE COMPENSATING SYSTEMS

Arthur W. Lo, Elizabeth, and Jan A. Rajchman and George R. Briggs, Princeton, N.J., assignors to Radio Corporation of America, a corporation of Delaware Application May 31, 1955, Serial No. 512,055

15 Claims. (Cl. 340—174)

This invention relates to magnetic systems, and particularly to magnetic shift registers.

Magnetic devices and systems for handling binary signals have been developed that employ magnetic elements made of material having a substantially rectangular hysteresis characteristic. These magnetic systems have the advantages of indefinite life, small size, and relatively small power supply. Among such magnetic systems that have been developed are magnetic shift registers. In such registers, binary signals are stored in magnetic elements in the form of the residual flux of the cores, which flux may assume either one of two directions. An example of a magnetic shift register is described in an article by Wang and Woo entitled "Static Magnetic Storage and Delay Line," Journal of Applied Physics, vol 21, January 1950, page 49. Magnetic shift registers have been found useful in ring counter, switching, information handling, and pulse commutating or distributing circuits.

The magnetic materials used for the magnetic elements in a shift register may have hysteresis loops that depart from the ideal rectangular hysteresis loop. With such magnetic materials, noise or spurious signals tend to be developed during operation of a shift register. These noise signals may result in faulty operation of a shift register.

Among the objects of this invention are to provide:

A new and improved magnetic shift register;

A new and improved magnetic system in which noise signals are substantially eliminated;

A new and improved magnetic shift register that operates relatively reliably.

In accordance with this invention an impedance is coupled in an advance winding circuit of a shift register and also to a plurality of the interstage transfer circuits of the register to neutralize the effects of spurious transfer signals. In accordance with one embodiment of this invention, the impedance for opposing the noise signals includes a winding linked to a compensating magnetic element. A voltage pulse is developed across this compensating element winding due to an advance current pulse, which voltage pulse is applied to the transfer circuits to block the transfer of the noise signals. In accordance with another embodiment of the invention, another winding linked to the compensating magnetic element is employed for developing the blocking pulse that is applied to the transfer circuits.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figure 1:
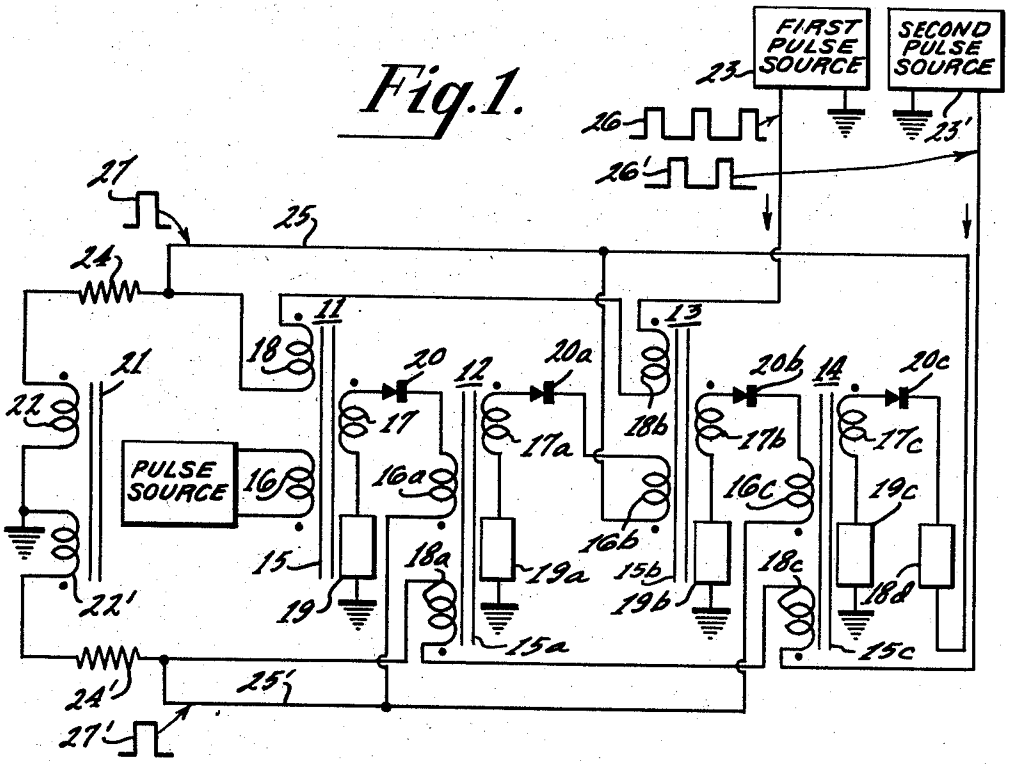
Figure 1 is a schematic circuit diagram of a magnetic shift register and core compensating system embodying this invention.

In Figure 1, four stages 11 to 14 of a magnetic shift register are shown. The stages are generally identical, and, therefore, the construction on only the first stage 11 is described in detail; any differences in the other stages are discussed below. Corresponding parts in the second through fourth stages 12 to 14 are referenced by the same numerals as the parts in the first stage 11 with the addition of successive alphabetical references *a* to *c*, respectively. This reference numeral and letter system is also used in other figures of the drawing. The first stage 11 includes a magnetic element that may be made of material having a hysteresis curve of the type shown in Figure 2.

Desirable characteristics of the core material are a high saturation flux density $B_s$, a high residual flux density $B_r$ substantially equal to $B_s$, and a low coercive force $H_c$. Opposite magnetic states or directions of flux in a core are represented by P and N. If a magnetizing force tending to change the flux to direction N is applied to a core which is already in state N, a relatively small change in the core flux density takes place. Ideally, if the magnetizing force in a flux reversing direction is less than the coercive force, the flux density does not change, and the residual magnetism is substantially unchanged. In practice the magnetic cores are sufficiently close to the ideal to have two stable remanent states.

Linked to the first core 15 are an input winding 16, an output winding 17, and an advance winding 18. The relative senses of linkage of the windings are indicated by dot marks next to terminals of the windings in accordance with the usual transformer convention. A load impedance 19 is connected between a source of reference potential shown as the conventional ground symbol and the unmarked terminal of the output winding 17. The marked terminal of the output winding 17 is connected to the anode of a diode 20, the cathode of which is connected to the unmarked terminal of the second stage input winding **16*a*. Succeeding stages are coupled in the same manner, except the last stage 14. In this stage 14, the cathode of the diode 20*c* is connected to a load 18*d*** which may be the input winding of a stage in another register (not shown) or any other appropriate form of output load.

A compensating core 21 is provided, which core 21 may be the same as the register cores 15 to **15*c*. Linked to the compensating core 21 are two compensating windings 22 and 22'. A first energizing circuit for the advance windings 18 and 18*b* of the odd numbered stages includes a first pulse source 23 connected to the marked terminal of the winding 18*b*, the unmarked terminal of which is connected to the marked terminal of the winding 18. The energizing circuit is completed from the unmarked terminal winding 18 through a resistor 24 to the marked terminal of the compensating winding 22, the unmarked terminal of which is returned to ground. A similar energizing circuit for the even stage advance windings 18*a* and 18*c* includes a second pulse source 23', the advance windings 18*c* and 18*a*, a resistor 24', and the second compensating winding 22'. A first voltage bus 25 is connected to the junction of the resistor 24 and the winding 18**. The marked terminal of the third stage input winding 16*b* is connected to the bus 25 as is the corresponding terminal of the output load 18*d*. A similar voltage bus 25′ is connected between the junction of the resistor 24′ and the winding 18*a*. The marked terminals of the input windings 16*a* and 16*c* are connected to the bus 25′.

The pulse sources 23 and 23′ may be any appropriate form of constant-current generators which can supply constant-amplitude advance current pulses 26 and 26′, respectively, alternately to the odd-numbered and even-numbered stage advance windings, respectively. The sources 23 and 23′ may include, for example, pentodes, the cathodes of which are connected to the windings 18*b* and 18*c*, respectively. The load impedances 19 to 19*c* may be any appropriate circuit for receiving current pulses in accordance with the magnetic states of the shift register cores 15 to 15*c*. For example, each load impedance 19 to 19*c* may be a winding on a different magnetic element (not shown).

Connected to the first stage input terminal 16 is a pulse source which supplies input pulses synchronously with the second advance pulses 26′. The circuit of Figure 1 may be operated as a ring counter by employing the last stage output winding 17*c* as the pulse source for the first stage input winding 16. In this case, the load 18*b* would be replaced by the input winding 16 with the circuit connected in the same manner as in the other interstage circuits.

As initial conditions the third core 15*b* is assumed to be in state P and the other cores 15, 15*a*, 15*c* are assumed to be in state N. The direction of conventional current flow for the advance current pulses 26 and 26′ is into the marked terminals of the associated advance winding 18 to 18*c* and the associated compensating windings 22 and 22′. These advance pulses 26 and 26′ tend to drive the associated cores to state N. Each cycle of operation includes a first advance current pulse followed by a second advance current pulse 26′, the time relationships of which are shown graphically in Figure 1.

The first advance pulse 26 of the first cycle produces a small change in flux in the first core 15 since this core is already in state N. However, the third core 15*b* is shifted from state P to state N, and the resulting large change of flux in that core 17*b* induces voltages in the output winding 17*b* and in the input winding 16*b*. The voltage induced in the output winding 17*b* is positive-going with respect to ground at the marked terminal thereof. As a result a transfer current flows from ground through the load 19*b* in the forward direction through the diode 20*b* through the input winding 16*c* of the next stage through the bus 25′, the resistor 24′, the compensating winding 22′, and back to ground. The direction of current flow in the next stage input winding 16*c* is such as to drive the fourth core 15*c* from state N to state P.

The voltage induced in the third stage input winding 16*b* by the change of the third core 15*b* from state P to state N is in a direction tending to draw current forwardly through the diode 20*a*. However, this current flow forwardly through the diode 20*a* is blocked by a voltage pulse 27 developed by the first advance pulse 26 across the resistor 24. As a result there is no current through the diode 20*a* and, therefore, no transfer of information in the backward direction of the shift register. The change of state of the fourth core 15*c* from state N to state P induces a voltage in the output winding 17*c* which is of polarity tending to draw current in the back direction to the diode 20*c*. Due to the high back resistance of this diode 20*c*, such current flow is kept to a negligible amount.

In a similar manner, the second advance pulse 26′ of the first cycle drives the fourth core from state P to state N to draw transfer current through the load impedance 19*c* and the output load 18*d*. In general, each first advance pulse 26 operates to transfer the state P in any of the odd stage cores to the succeeding even stage cores, and each second advance pulse 26′ transfers the state P from any of the even stage cores to the succeeding odd stage cores. In the course of transferring the state P from a core, the load impedance associated with that core is supplied with a current pulse which is substantially the same as the advance pulse due to the transformer coupling through the core.

The circuit of the compensating core 21 permits the use of magnetic cores made of materials that have hysteresis loops differing substantially from the ideal of a rectangular loop. As indicated graphically in Figure 2, the residual flux density $B_r$ in a non-rectangular loop material may be substantially less than the saturated flux density $B_s$. A core of such non-rectangular loop material which is in a condition of greatest remanent flux density in state N is in a state corresponding to point $N_1$ of Figure 2. An advance pulse 26 drives this core into saturation, point $N_2$, causing a noise flux change and inducing a small noise pulse 28 in the output winding of the core at the beginning of the pulse 26, as shown graphically in Figure 3. The polarity of this noise pulse 28 is such as to pass in the forward direction through the interstage diode connected to the core output winding. A second pulse 29 of opposite polarity is induced in the output winding of the core upon termination of the advance pulse 26 and the return of the core to its remanent state N. The second noise pulse 29 is blocked by the interstage diode connected to the output winding.

For example, the noise pulse 28 induced in the output winding 17 when the first core 15 is driven further into state N tends to drive the second core 15*a* towards state P. The amplitude of the pulse 28 is such as to cause the second core 15*a* to traverse a minor hysteresis loop and return to a remanent state such as indicated at point $N_3$ in Figure 2. When the second core 15*a* is driven by an advance pulse 26′ to saturation $N_2$ the noise pulse 28 is larger in amplitude due to the greater flux change. As a result, the third core 15*b* is driven to a remanent state such as indicated at point $N_4$ in Figure 2. Thus, the effect of the non-rectangular hysteresis loop is cumulative from stage to stage and may become sufficiently large to drive a core to state P and, thereby, cause the circuit to operate in an improper manner.

When the first advance pulse 26 is applied to the odd stages 11 and 13, one or both of the odd stage cores 15, 15*b* may be already in state N and, therefore, driven further into state N. The same advance pulse 26 applied to the compensating winding 22 also drives the compensating core 21 further into state N. As a result, there is a pulse induced in the second compensating winding 22′ which is of substantially the same amplitude as the noise pulse 28 induced in the output windings 17 and 17*b*. The voltage pulse induced in the compensating winding 22′ is applied to the bus 25′ in a direction that tends to bias the transfer diodes 20 and 20*b* in the reverse direction and prevent the transfer of the noise pulses 28 that were induced in the output windings 17 and 17*b*. During most of the period of the advance pulse 26 the compensating core 21 is saturated and does not impede the flow of current through any of the transfer diodes. For example, if the core 15*b* is driven from state P to N by an advance pulse 26, the transfer pulse through the diode 20*b* is attenuated somewhat by the compensating pulse at the beginning of the advance pulse period, but not during the remainder of that period.

Upon termination of the first advance pulse 26 the negative-going noise pulse 29 induced at the marked terminal of the compensating winding 22′ is opposed by the corresponding negative-going noise pulses 29′ induced in the odd stage output windings 17 and 17*b*. Therefore, these noise pulses 29 tend to neutralize each other without adverse effect on the operation of the shift register.

The second advance pulse 26′ also induces a compensating pulse in the winding 22 which neutralizes noise pulses 28 in the even stage output windings 17a and 17c. The operation of the circuit during the second advance pulse will be apparent from the preceding description.

Figure 4:
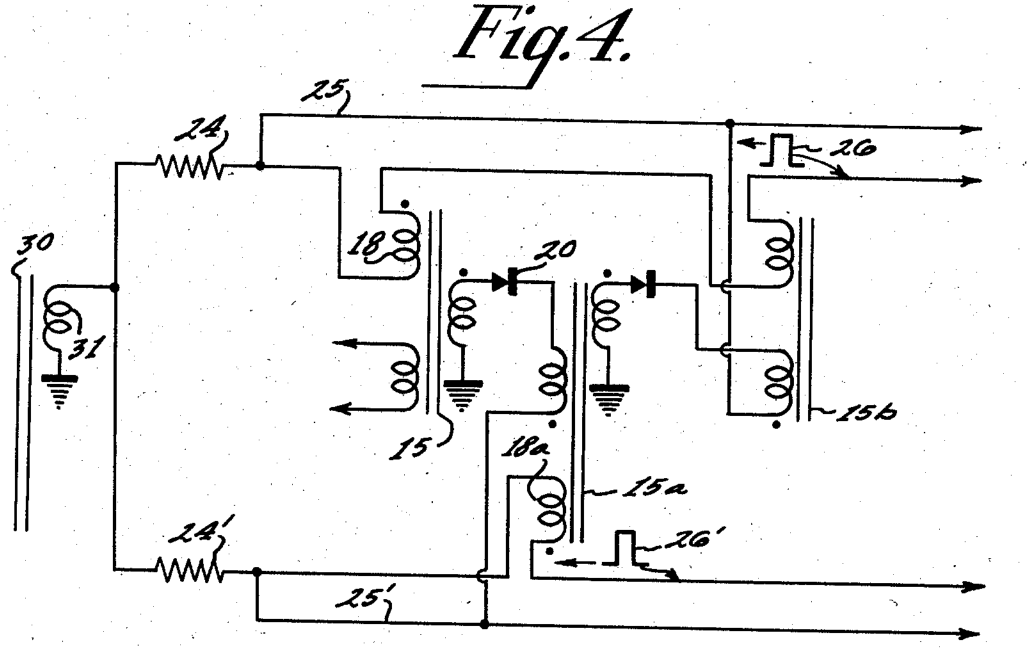
Figure 4 is a schematic circuit diagram of a modification of the circuit of Figure 1.

In Figure 4, a modified compensating system for magnetic shift registers is shown. Parts corresponding to those previously described are referenced by the same numerals. A single compensating core 30 is provided for the shift register. A single compensating winding 31 linked to the compensating core has one terminal connected to ground and the other terminal connected to the low voltage terminals of the resistors 24 and 24′.

Figure 2:
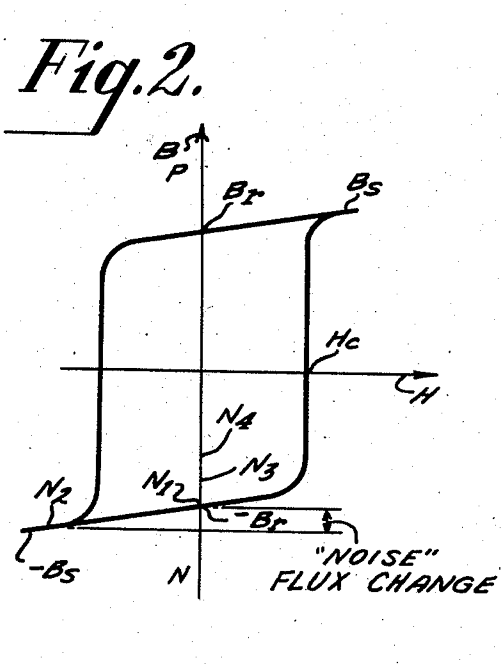
Figure 2 is an idealized graph of the hysteresis loop of magnetic core materials that may be employed in the circuit of Figure 1.
Figure 3:
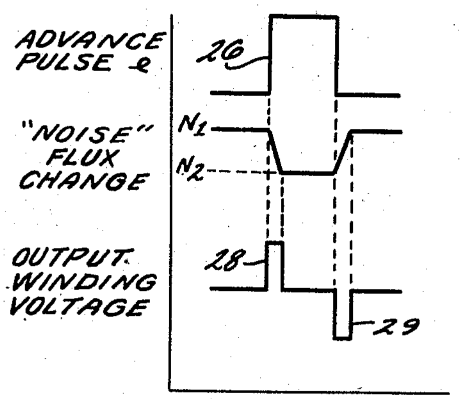
Figure 3 is an idealized graph on the same time base of waveforms occuring in portions of the circuit of Figure 1.

A first advance pulse 26 which is applied to the odd stages to the compensating winding 31 tends to drive the compensating core 30 from remanence in state N, point $N_1$ in Figure 2, to saturation, point $N_2$. The voltage developed across the compensating winding 31 in driving the compensating core further into state N is fed to the second bus 25 and is of amplitude and polarity such as to neutralize any noise pulses 28 developed in the odd stage output windings. This voltage developed across the compensating winding 31 is also fed to the first bus 25 and aids the voltage developed across the resistor 24 by the advance pulse 26. Thus, this compensating winding voltage aids in preventing backward flow of information to the preceding stages. A second advance pulse 26′ similarly develops a compensating voltage across the compensating winding 31 which is fed to the first bus 25 to block the transfer of noise pulses 28 developed in the even stage output windings in the same manner.

Figure 5:
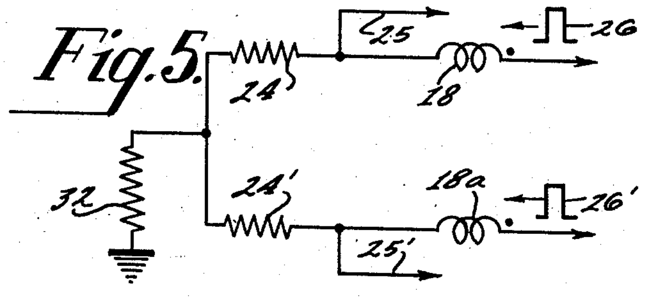
Figure 5 is a schematic circuit diagram of another modification of the circuit of Figure 1.

A modification of the core compensating system of this invention is shown in Figure 5. A common resistor 32 is connected between ground and the low voltage terminals of the resistors 24 and 24′. The first advance pulse 26 produces a voltage drop across the common resistor 32 which is fed to the second bus 25′. The polarity and amplitude of this common resistor voltage is such as to neutralize the effect of noise pulses 28 developed in odd stage output windings in the same manner as described above with respect to Figure 4. Likewise, the second advance pulse 26′ develops a voltage across the common resistor 32 to bias off the interstage diodes connected to the even stage output windings.

The advance pulses 26 and 26′ are preferably constant current pulses and, therefore, are substantially unaffected by the small bias developed across the common resistor 32. The bias voltage developed across the common resistor 32 lasts for the entire period of the advance pulses and, therefore, tends to cancel a part of the transfer voltage pulse developed with a change of a core from state P to state N. In the core compensating systems of Figure 1 and Figure 4 however, the compensating voltages only last for a small portion of the advance pulse duration and do not affect the transfer voltages for most of the period of the advance pulse.

Figure 6:
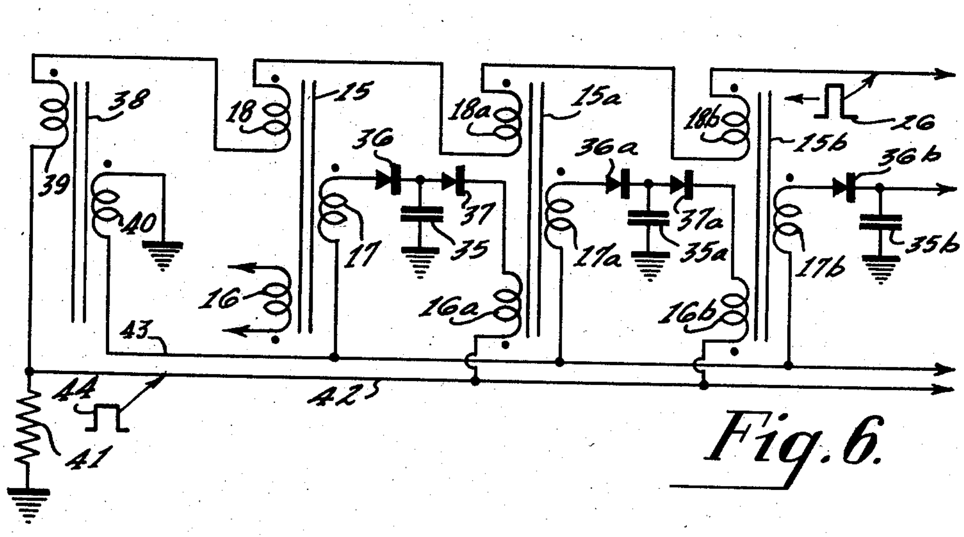
Figure 6 is a schematic circuit diagram of a core compensating system embodying this invention used with another type of magnetic shift register.

In Figure 6 a core compensating system similar to the one shown in Figure 1 is shown used with a magnetic shift register having a different type of interstage transfer circuit. Parts corresponding to those previously described are referenced by the same numerals. The transfer circuit between the first stage output winding 17 and the second stage input winding 16a includes a capacitor 35. The marked terminal of the winding 17 is connected through a charging diode 36 to one terminal of the capacitor 35. The same terminal of the capacitor 35 is connected through a discharging diode 37 to the unmarked terminal of the input winding 16a. The other terminal of the capacitor 35 is returned to ground. The interstage transfer circuits of the succeeding stages are the same.

The advance windings 18 to 18b of all the stages are connected in series with each other to receive the advance current pulse 26. An advance cycle includes but a single advance pulse. A compensating core 38 is provided and is linked by a first and a second winding 39 and 40, respectively. The unmarked terminal of the first stage advance winding 18 is connected to the marked terminal of the first winding 39, the unmarked terminal of which is connected through a biasing resistor 41 to ground. A bus 42 is connected to the junction of the resistor 41 and the coil 39 and also to the marked terminals of the input windings 16a and 16b. The unmarked terminal of the second winding 40 is connected to a bus 43 and, therethrough, to the unmarked terminals of the output windings 17 to 17b. The marked terminal of the winding 40 is returned to ground.

The states of the cores are all assumed to be in state N except the core 15a which is assumed to be in state P. An advance pulse 26 drives the core 15a to state N inducing a positive-going voltage at the marked terminal of the winding 17a, which voltage is passed by the charge diode 36a and charges the capacitor 35a. At the same time this advance pulse 26 develops a voltage pulse 44 across the resistor 41 which pulse 44 is applied through the bus 42 to the cathode of the discharge diode 37a. The pulse 44 blocks current flow through the diode 37a during the charging of the capacitor 35a. Upon termination of the advance pulse 26, the capacitor 35a discharges through the diode 37a, the input winding 16b, and the resistor 41. This discharge current flows through the third stage input winding 16b and drives the core 15b from state N to state P. In this manner successive advance pulses 26 shift the state P from one core to the succeeding core.

As the advance pulse 26 starts to drive the second core 15a from state P to state N this same advance pulse 26 drives the first core 15 further into saturation (point $N_2$ in Figure 2) to induce a noise pulse 28 in the output winding 17. At this time the compensating core 38 is also driven to point $N_2$ by the same advance pulse 26 in the winding 39. A noise pulse 28 is likewise induced in the winding 40 of the compensating core 38 which pulse is applied to the bus 43 in a direction to oppose the noise pulse induced in the output winding 17. Since the pulses induced in the winding 17 and 40 are of substantially the same amplitude the noise pulse in the winding 17 is neutralized. Likewise, noise pulses in the other stage output windings are also neutralized. The noise pulse 29 induced in the winding 40 upon termination of this advance pulse 26 is opposed by the corresponding noise pulses induced in the output windings of the register cores at this time. Therefore, these noise pulses 29 are neutralized.

The core compensating system of this invention is not restricted in its application to the types of shift registers described above. In the copending patent application, Serial No. 512,056, filed concurrently herewith by these same inventors and assigned to the same assignee as this application, a core compensating system embodying this invention is shown used with another form of magnetic shift register.

It is seen from the above description of this invention that a new and improved magnetic shift register is provided. Noise signals due to the imperfect characteristic of the core material are substantially eliminated and reliable operation of the shift register thereby provided.

We claim:

1. A magnetic system comprising a plurality of saturable magnetic elements each made of material having two directions of remanent flux density and which may not be saturated at remanence, first winding means linked to said elements for applying magnetizing forces thereto in a direction tending to saturate said elements in one of said directions, separate means including a transfer winding linked to each of said elements for coupling said elements in an ordinal relationship and for transferring signals from each of said elements to a succeeding one of said elements, and common means connected in a different series circuit with each of said signal transferring means tending to neutralize the effect of signals induced in said transfer windings with changes of flux in said elements between remanence and saturation in the same flux direction, said common means comprising a common impedance connected to a plurality of said first winding means.

2. A magnetic system comprising a plurality of saturable magnetic elements each made of material having two directions of remanent flux density and which may not be saturated at remanence, first winding means linked to said elements for applying magnetizing forces thereto in a direction tending to saturate said elements in one of said directions, separate means including a transfer winding linked to each of said elements for coupling said elements in an ordinal relationship and for transferring signals from each of said elements to a succeeding one of said elements, and common means connected in a different series circuit with each of said signal transferring means tending to neutralize the effect of signals induced in said transfer windings with changes of flux in said elements between remanence and saturation in the same flux direction, said common neutralizing means comprising a common impedance connected in series with a plurality of said first winding means.

3. A magnetic system comprising a plurality of saturable magnetic elements each made of material having two directions of remanent flux density and which may not be saturated at remanence, first winding means linked to said elements for applying magnetizing forces thereto in a direction tending to saturate said elements in one of said directions, separate means including a transfer winding linked to each of said elements for coupling said elements in an ordinal relationship and for transferring signals from each of said elements to a succeeding one of said elements, and common means connected in a different series circuit with each of said transfer means tending to neutralize the effect of signals induced in said transfer windings with changes of flux in said elements between remanence and saturation in the same flux direction, said common neutralizing means including an impedance connected in a series combination with said first winding means for applying to all of said transfer means a voltage tending to block transfer of said signals incident to the flow of a current pulse in said series combination.

4. A magnetic system comprising a plurality of saturable magnetic elements each made of material having two directions of remanent flux density and which may not be saturated at remanence, first winding means linked to said elements for applying magnetizing forces thereto in a direction tending to saturate said elements in one of said directions, separate means including a transfer winding linked to each of said elements for coupling said elements in an ordinal relationship and for transferring signals from each of said elements to a succeeding one of said elements, and common means connected in a different series circuit with each of said signal transferring means tending to neutralize the effect of signals induced in said transfer windings with changes of flux in said elements between remanence and saturation in the same flux direction, said common neutralizing means including a resistor connected in a series combination with said first winding means for applying to all of said transfer means a voltage tending to block transfer of said signals incident to the flow of a current pulse in said series combination.

5. A magnetic system comprising a plurality of saturable magnetic elements each made of material having two directions of remanent flux density and which may not be saturated at remanence, first winding means linked to said elements for applying magnetizing forces thereto in a direction tending to saturate said elements in one of said directions, separate means including a transfer winding linked to each of said elements for coupling said elements in an ordinal relationship and for transferring signals from each of said elements to a succeeding one of said elements, an additional magnetic element, and a common winding linked to said additional element and connected in a different series circuit with each of said transfer means for developing a voltage to oppose voltages induced in said transfer windings with changes of flux in said plurality of elements between remanence and saturation in the same flux direction.

6. A magnetic system comprising a plurality of saturable magnetic elements each made of material having two directions of remanent flux density and which may not be saturated at remanence, first winding means linked to said elements for applying magnetizing forces thereto in a direction tending to saturate said elements in one of said directions, separate means including a transfer winding linked to each of said elements for coupling said elements in an ordinal relationship and for transferring signals from each of said elements to a succeeding one of said elements, an additional magnetic element, and a common winding linked to said additional element and connected in a different series circuit with each of said transfer means for developing a voltage to oppose voltages induced in said transfer windings with changes of flux in said plurality of elements between remanence and saturation in the same flux direction, and common winding being connected in a series combination with said first winding means.

7. A magnetic system comprising a plurality of saturable magnetic elements each made of material having two directions of remanent flux density and which may not be saturated at remanence, first winding means linked to said elements for applying magnetizing forces thereto in a direction tending to saturate said elements in one of said directions, separate means including a transfer winding linked to each of said elements for coupling said elements in an ordinal relationship and for transferring signals from each of said elements to a succeeding one of said elements, and means responsive to currents applied to said first winding means for producing a voltage to oppose voltages induced in said transfer windings with changes of flux in said plurality of elements between remanence and saturation in the same flux direction, said responsive means including an additional magnetic element, a first winding linked to said additional magnetic element and connected in a different series circuit with each of said transfer means, and a second winding linked to said additional element and connected in a series combination with said first winding means.

8. A magnetic system comprising a plurality of saturable magnetic elements each made of material having two directions of remanent flux density and which may not be saturated at remanence, said elements having an ordinal relationship, first winding means linked to said elements for applying magnetizing forces thereto in a direction tending to saturate said elements in one of said directions, separate input and output windings linked to each of said elements, means including separate unilateral impedances for coupling each of said output windings in a different series combination with the input winding of the succeeding one of said elements, and common means connected to each of said unilateral impedances for applying voltages thereto in a direction tending to neutralize the effect of voltages induced in said output windings with changes of flux in said elements between remanence and saturation in the same flux direction, said common means including a common impedance coupled to a plurality of said first winding means.

9. A magnetic system comprising a plurality of saturable magnetic elements each made of material having two directions of remanent flux density and which may not be saturated at remanence, said elements having an ordinal relationship, first winding means linked to said elements for applying magnetizing forces thereto in a direction tending to saturate said elements in one of said directions, separate input and output windings linked to each of said elements, means including separate unilateral impedances for coupling each of said output windings in a different series combination with the input winding of the succeeding one of said elements, and common means connected to each of said unilateral impedances for applying voltages thereto in a direction tending to neutralize the effect of voltages induced in said output windings with changes of flux in said elements between remanence and saturation in the same flux direction, said common means comprising a common impedance coupled to all of said first winding means to receive currents applied thereto.

10. A magnetic system comprising a plurality of saturable magnetic elements each made of material having two directions of remanent flux density and which may not be saturated at remanence, said elements having an ordinal relationship, first winding means linked to said elements for applying magnetizing forces thereto in a direction tending to saturate said elements in one of said directions, separate input and output windings linked to each of said elements, means including separate unilateral impedances for coupling each of said output windings in a different series combination with the input winding of the succeeding one of said elements, and common means connected to each of said unilateral impedances for applying voltages thereto in a direction tending to neutralize the effect of voltages induced in said output windings with changes of flux in said elements between remanence and saturation in the same flux direction, said common means including an additional magnetic element, and a first and a second winding linked to said additional element, said first winding being in series with each of said series combinations, said second winding being connected in a series combination with said first winding means.

11. A magnetic system comprising a plurality of saturable magnetic elements each made of material having two directions of remanent flux density and a flux density at remanence that may be different from its flux density at saturation, said magnetic elements having an ordinal relationship and being associated in a first and a second group, first and second advance winding means respectively linked to said first and second group elements for applying magnetizing forces thereto in a direction tending to saturate said elements in one of said directions, separate input and output windings linked to said elements, a separate unilateral impedance individually connected in a series combination with each of said output windings and with the input winding linked to the succeeding element, and means including a common impedance coupled in circuit with all of said first advance winding means for applying, incident to a current pulse in any one of said first advance winding means, a blocking voltage to each of said unilateral impedances of said series combinations that include a second group output winding, said voltage applying means applying, incident to a current pulse in said second advance winding means, a blocking voltage to each of said unilateral impedances of said series combinations including a second group output winding.

12. A magnetic system comprising a plurality of saturable magnetic elements each made of material having two directions of remanent flux density and a flux density at remanence that may be different from its flux density at saturation, said magnetic elements having an ordinal relationship and being associated in a first and a second group, first and second advance winding means respectively linked to said first and second group elements for applying magnetizing forces thereto in a direction tending to saturate said elements in one of said directions, separate input and output windings linked to said elements, a separate unilateral impedance individually connected in a series combination with each of said output windings and with the input winding linked to the succeeding element, and means coupled in circuit with said advance winding means for applying, incident to a current pulse in one of said advancing winding means, a blocking voltage to each of said unilateral impedances of said series combinations including a first group output winding, said voltage applying means applying, incident to a current pulse in the other of said winding means, a blocking voltage to each of said unilateral impedances of said series combinations including a second group output winding, said voltage applying means including an additional magnetic element, a first and a second winding linked to said additional element and respectively connected in series with said first and second advancing means, said first and second windings being respectively connected to said second and first group unilateral impedances.

13. A magnetic system comprising a plurality of saturable magnetic elements each made of material having two directions of remanent flux density and a flux density at remanence that may be different from its flux density at saturation, said magnetic elements having an ordinal relationship and being associated in a first and a second group, first and second advance winding means respectively linked to said first and second group elements for applying magnetizing forces thereto in a direction tending to saturate said elements in one of said directions, separate input and output windings linked to said elements, a separate unilateral impedance individually connected in a series combination with each of said output windings and with the input winding linked to the succeeding element, and means coupled in circuit with said advance winding means for applying, incident to a current pulse in one of said advancing winding means, a blocking voltage to each of said unilateral impedances of said series combinations including a first group output winding, said voltage applying means applying, incident to a current pulse in the other of said winding means, a blocking voltage to each of said unilateral impedances of said series combinations including a second group output winding, said voltage applying means including an additional magnetic element, a winding linked to said additional element and connected in series with both of said advancing means and to all of said unilateral impedances.

14. A magnetic system comprising a plurality of saturable magnetic elements each made of material having two directions of remanent flux density and which may not be saturated at remanence, said elements having an ordinal relationship, first winding means linked to said elements for applying magnetizing forces thereto in a direction tending to saturate said elements in one of said directions, separate input and output windings linked to each of said elements, means including separate unilateral impedances for coupling each of said output windings in a different series combination with the input winding of the succeeding one of said elements, and common means including a common impedance connected to a plurality of said first winding means and to a plurality of said unilateral impedances for applying voltages thereto in a direction tending to neutralize the effect of voltages induced in said output windings with changes of flux in said elements between remanence and saturation in the same flux direction and for applying voltages thereto in a direction tending to neutralize the effect of voltages induced in said input windings with the application of magnetizing forces by said first winding means.

15. A magnetic system comprising a plurality of saturable magnetic elements each made of material having two directions of remanent flux density and which may not be saturated at remanence, said elements having an ordinal relationship, first winding means linked to said elements for applying magnetizing forces thereto in a direction tending to saturate said elements in one of said directions, separate input and output windings linked to each of said elements, means including separate unilateral impedances for coupling each of said output windings in a different series combination with the input winding of the succeeding one of said elements, and common means including a common impedance coupled to certain ones of said unilateral impedances and to certain ones said first winding means for applying voltages to said certain unilateral impedances in a direction tending to neutralize the effect of undesired voltages induced in said input windings with the application of magnetizing forces by said certain first winding means.

References Cited in the file of this patent

UNITED STATES PATENTS

| | | |
|---|---|---|
| 2,708,722 | Wang | May 17, 1955 |
| 2,768,312 | Goodale et al. | Oct. 23, 1956 |
| 2,825,890 | Ridler et al. | Mar. 4, 1958 |